United States Patent
Shi et al.

(10) Patent No.: US 10,634,457 B2
(45) Date of Patent: Apr. 28, 2020

(54) STEALTH METHOD BY USE OF THREE-DIMENSIONAL SPRAYING

(71) Applicants: Jianbo Shi, Shanxi (CN); Zhanyu Shi, Shanxi (CN)

(72) Inventors: Jianbo Shi, Shanxi (CN); Zhanyu Shi, Shanxi (CN)

(*) Notice: Subject to any disclaimer, the term of this patent is extended or adjusted under 35 U.S.C. 154(b) by 269 days.

(21) Appl. No.: 15/568,812

(22) PCT Filed: Jul. 8, 2016

(86) PCT No.: PCT/CN2016/089384
§ 371 (c)(1),
(2) Date: Oct. 24, 2017

(87) PCT Pub. No.: WO2017/219392
PCT Pub. Date: Dec. 28, 2017

(65) Prior Publication Data
US 2018/0216918 A1    Aug. 2, 2018

(30) Foreign Application Priority Data

Jun. 24, 2016 (CN) .......................... 2016 1 0473768

(51) Int. Cl.
*F41H 3/00* (2006.01)
*E04H 9/04* (2006.01)
*F41H 13/00* (2006.01)
*G06T 15/20* (2011.01)
*G06T 19/00* (2011.01)

(52) U.S. Cl.
CPC ................ *F41H 3/00* (2013.01); *E04H 9/04* (2013.01); *F41H 13/0093* (2013.01); *G06T 15/205* (2013.01); *G06T 19/006* (2013.01)

(58) Field of Classification Search
None
See application file for complete search history.

(56) References Cited

U.S. PATENT DOCUMENTS

| 4,576,904 A * | 3/1986 | Anitole ..................... B44F 5/00 355/18 |
| 2012/0196069 A1* | 8/2012 | Boiteux ..................... F41H 3/00 428/39 |

* cited by examiner

*Primary Examiner* — Duy Vu N Deo
*Assistant Examiner* — Bradford M Gates

(57) ABSTRACT

The invention discloses a stealth method by use of three-dimensional spraying. The method comprises the following steps of: firstly photographing an object target on the ground and then archiving photos to obtain three-dimensional spraying data fused with the surrounding geographical environment through computer simulation design; producing corresponding three-dimensional spraying templates according to the three-dimensional spraying data; producing desired three-dimensional spraying equipment; producing special spraying coating for three-dimensional spraying; spraying the special three-dimensional spraying coating on surfaces of the object target on the ground by means of the three-dimensional spraying equipment according to the three-dimensional spraying data; and erecting and deploying electromagnetic jammers and GPS jammers around the object target on the ground so that space, sky and ground electromagnetic detection equipment and GPS positioning detection equipment of the attacker are effectively interfered and suppressed in the full frequency band.

9 Claims, 3 Drawing Sheets

STEALTH METHOD BY USE OF THREE-DIMENSIONAL SPRAYING

FIELD OF INVENTION

Figure 1:
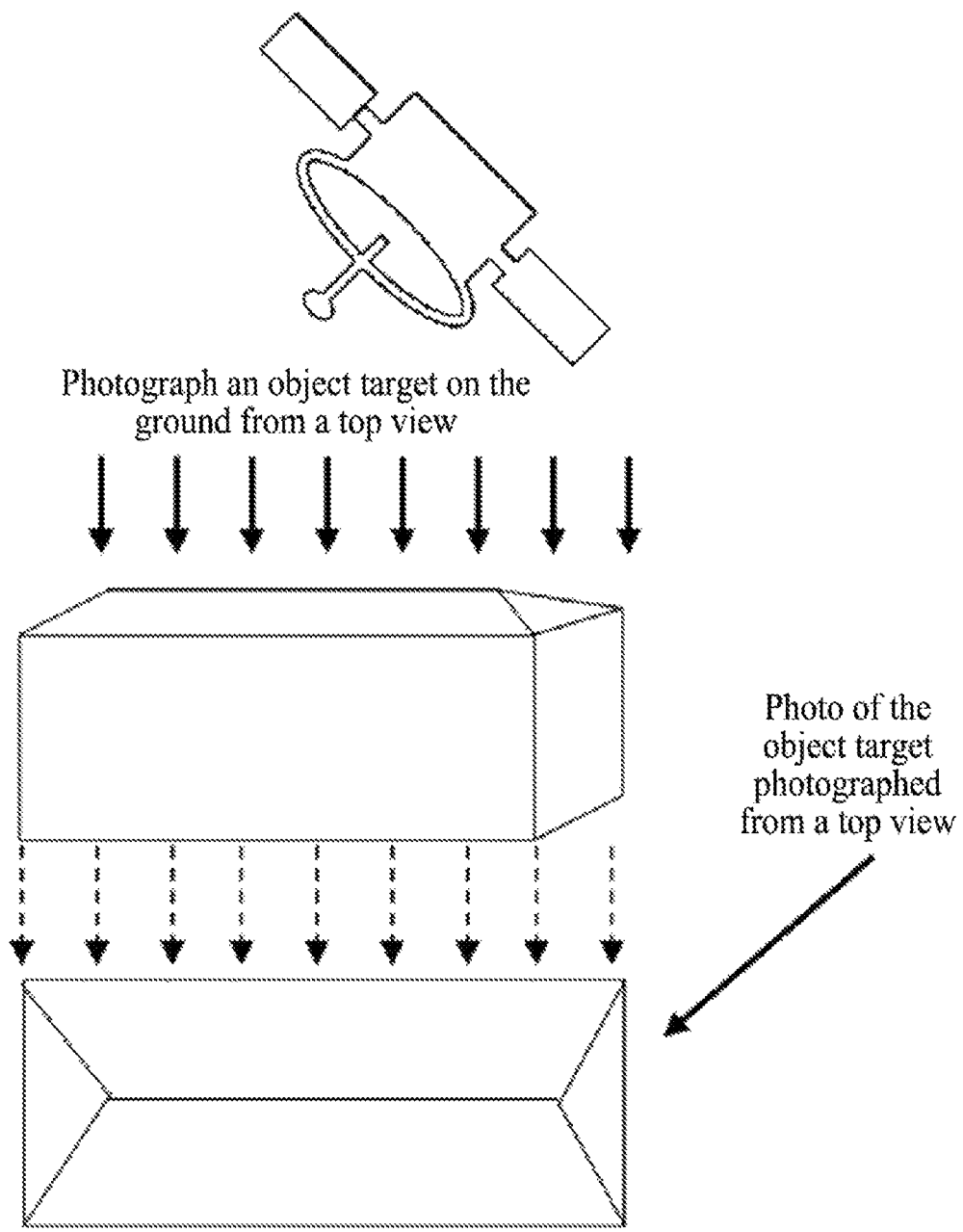

The invention relates to the field of stealth technology for conventional object targets, in particular to a simple and convenient stealth method by use of three-dimensional spraying.

BACKGROUND OF THE INVENTION

As space, sky and ground reconnaissance ways are updated continuously as well as the accuracy and resolution for reconnaissance are getting higher and higher, the resolution of the existing reconnaissance equipment has reached millimeter scale. However, the main reconnaissance ways thereof are still to photograph and carry out electromagnetic detection, laser detection and GPS positioning detection on objects on the earth surface through UAVs, manned reconnaissance aircrafts and reconnaissance satellites to obtain various types of landmark data and related pictures of buildings, objects and military targets on the ground in countries and regions under surveillance, and then input these data and pictures into a guidance system of various types of missiles or precision guided bombs. And, main guidance modes often adopted by these missiles and bombs are inertial guidance, electromagnetic guidance, GPS guidance, terminal image comparison and other guidance technologies or homing means, resulting in that these buildings, objects and military targets on the ground are threatened by the various types of missiles and precision guided bombs. In case of war, these buildings, objects and military targets on the ground will be subjected to precision attack from these missiles and bombs overnight and are completely destroyed. As known from the Iraq war in the beginning of this century, it is very easy to find the buildings and objects on the ground by space, sky and ground reconnaissance equipment. Moreover, the buildings on the ground cannot move by themselves, so that it is easy to disable the due functions thereof after suffering destructive attacks. Not only that, but due to lack of necessary stealth protection, the various types of military targets on the ground also lose the due functions thereof as military targets after suffering massive air strikes in the early war. Thus, countries are devoting to research about the stealth of the buildings, objects and military targets on the ground, and how to realize stealth of the buildings, objects and military targets on the ground has become the urgent matter and top priority at present.

At present, the whole world has entered the era of stealth in this century. Therefore, the countries around the world are developing their own unique and special stealth methods, and a variety of stealth means and stealth technologies for various types of object targets on the ground are also changing with each passing day. As things stand, how to protect the object targets required to be protected, defended and guarded on the ground from reconnaissance of photographic reconnaissance, electromagnetic detection, laser detection and GPS positioning detection equipment in the airspaces and how to better protect, defend and guard the buildings, objects and military targets on the ground during the war have become the primary tasks for stealth of object targets on the ground.

SUMMARY OF THE INVENTION

An objective of the invention is to provide a simple and convenient stealth method by use of three-dimensional spraying which solves the problem of how to deceive photographic reconnaissance equipment, electromagnetic detection, laser detection equipment and GPS geographic location reconnaissance equipment in the airspaces on reconnaissance against various types of targets on the ground. It effectively hides a large number of object targets on the ground by use of three-dimensional spraying, and also considers erecting and deploying electromagnetic jammers and GPS jammers around the object targets on the ground. The ultimate objective of this is to change the surface characteristics of various object targets on the ground by carrying out three-dimensional spraying on surfaces of the object targets, thus misleading cruise missiles and precision guided bombs that attack thereto and solving the problem that a large number of current object targets on the ground are ultimately destroyed by the cruise missiles and precision guided bombs due to the difficulty in dodging or avoiding the reconnaissance of various types of reconnaissance equipment in the airspaces.

To achieve the above objectives, the stealth method by use of three-dimensional spraying according to the invention comprises the following steps of:

A. Firstly photographing an object target on the ground and then archiving photos, and carrying out analysis and computer simulation design on a geographical environment in which the object target is located according to the aerial photos of the photographed object target to obtain three-dimensional spraying data fused with the surrounding geographical environment of the object target to be sprayed on the ground;

B. Producing corresponding three-dimensional spraying templates for comparison according to the three-dimensional spraying data at the same time;

C. Producing desired three-dimensional spraying equipment;

D. Producing special spraying coating for three-dimensional spraying;

E. Spraying the special three-dimensional spraying coating on surfaces of the object target on the ground by means of the three-dimensional spraying equipment according to the three-dimensional spraying data while using the corresponding three-dimensional spraying templates for comparison; and F. Erecting and deploying electromagnetic jammers and GPS jammers around the object target on the ground to effectively interfere with and suppress space, sky and ground electromagnetic detection equipment and GPS positioning detection equipment of the attacker in the full frequency band.

The three-dimensional spraying data in step A and step B is three-dimensional spraying data of the object target required of stealth from five views obtained by taking aerial or ground photos of the geographical environment in which the object target required of stealth on the ground is located through the computer simulation design. The corresponding three-dimensional spraying templates in simulation mode shall be produced for comparison needs after three-dimensional spraying, wherein the aerial or ground photos include photos obtained by photographing the object target required of stealth from five views.

The three-dimensional spraying templates in step B comprises three-dimensional spraying templates of the object target required of stealth from five views, and templates with three-dimensional simulation effect adapted to the surrounding geographical environment of the object target.

The three-dimensional spraying equipment in step C comprises heavy or large helicopter modified digital spraying equipment, self-propelled digital spraying equipment with lifting mechanism built-in and hand-held manual spraying equipment, where the heavy or large helicopter modified digital spraying equipment and the self-propelled digital spraying equipment with lifting mechanism built-in are special digital spraying equipment for three-dimensional spraying controlled by the industrial personal computer and capable of directly inputting the computer simulated three-dimensional spraying data adapted to the surrounding geographical environment of the target object into the built-in spraying equipment and carrying out three-dimensional stealth spraying on the surfaces of the object target required of stealth on the ground.

The heavy or large helicopter modified digital spraying equipment is used for carrying out rapid three-dimensional spraying on key military buildings.

The key military buildings comprise military bases of armed forces, satellite launch sites or intercontinental ballistic missile silos.

The self-propelled digital spraying equipment with lifting mechanism built-in is used for carrying out rapid three-dimensional spraying on buildings with groups of buildings.

The buildings with groups of buildings comprise military command centers and large dams.

The hand-held manual spraying equipment is used for carrying out emergency spraying on key vehicles or remote radar stations.

A stealth material against electromagnetic detection and laser detection is added to the special spraying coating in step D.

Compared with the prior art, the invention has the following advantages: the stealth method by use of three-dimensional spraying can deceive photographic reconnaissance, electromagnetic detection and optical reconnaissance employed in photographic reconnaissance equipment, electromagnetic detection and laser detection equipment and GPS geographic location reconnaissance equipment in airspaces and during ground remote reconnaissance, thereby achieving the purpose of hiding the object targets required to be given key protection, defense and guard on the ground. A stealth material against electromagnetic detection reconnaissance equipment, laser detection reconnaissance equipment and other reconnaissance equipment is added to the three-dimensional spraying coating so that the coating integrates optical stealth, electromagnetic stealth and laser stealth. Meanwhile, electromagnetic jammers and GPS jammers are also erected and deployed around the object target to improve the stealth capacity of the object target itself on the ground, thereby meeting requirements of protecting, defending and guarding key object targets.

BRIEF DESCRIPTION OF THE DRAWINGS

FIG. 1 is a schematic diagram of a roof photo of a roof before three-dimensional spraying.

FIG. 2 is a schematic diagram of a roof photo of the roof after three-dimensional spraying.

FIG. 3 is a schematic diagram of an object target on the ground with electromagnetic jammers and GPS jammers being erected and deployed around.

DETAILED DESCRIPTION OF SOME EMBODIMENTS

The following embodiments are provided to illustrate the invention but not to limit the scope thereof.

According to the invention, the stealth method by use of three-dimensional spraying comprises the following steps of:

A. Firstly photographing an object target required to be given key protection, defense and guard on the ground and then archiving photos, and carrying out essential analysis and then computer simulation design on the geographical environment in which the object target is located according to the aerial photos of the photographed object target to obtain three-dimensional spraying data fused with the surrounding geographical environments of buildings to be sprayed on the ground, the object target on the ground and military targets;

B. Further producing corresponding templates for comparison of three-dimensional spraying effects according to the three-dimensional spraying data at the same time;

C. Further producing desired three-dimensional spraying equipment after completion of three-dimensional spraying data acquisition and template production;

D. Producing special spraying coating for three-dimensional spraying;

E. Spraying the special three-dimensional spraying coating on surfaces of the object target on the ground by means of the three-dimensional spraying equipment according to the three-dimensional spraying data while using the corresponding three-dimensional spraying templates for stealth effect comparison; and F. Erecting and deploying electromagnetic jammers and GPS jammers around the object target on the ground to further enhance its stealth effect and efficiency, as shown in FIG. 3, wherein the electromagnetic jammer transmits electromagnetic interference waves and the GPS jammer transmits GPS interference waves to interfere with and mislead the attacks against the target object to which various types of cruise missiles and precision guided bombs have been launched on the ground, so that these cruise missiles and precision guided bombs cannot correctly compare the electromagnetic guided data, laser guided data, GPS guided data and terminal image data stored therein of the object target in real time during their attacks against the object target, resulting in that the various types of cruise missiles and precision guided bombs attacking the object target are swerved or self-destructed in case of losing the target due to their data comparison errors, and ensuring better stealth and sheltering effects of the object targets required to be protected, defended and guarded on the ground. In this way, there are great benefits of minimizing the ability of photographic reconnaissance equipment, electromagnetic detection equipment and laser detection equipment in the airspaces to identify a large number of object targets on the ground, and protecting the object targets on the ground from being attacked by various types of guided missiles and precision guided bombs during the war. The distances for erection and deployment as well as the number of electromagnetic jammers and GPS jammers depend on the transmission power and interference power of the electromagnetic jammers and GPS jammers, allowing the electromagnetic jammers and GPS jammers to effectively interfere with and suppress space, sky and ground electromagnetic detection equipment and GPS positioning detection equipment of the attacker in the full frequency band, so that the various types of cruise missiles or precision guided bombs launched by the attacker against the object target cannot make a correct judgment on the object target due to electromagnetic interference and GPS signal interference, resulting in that these cruise missiles and precision guided bombs are swerved or self-destructed in case of losing the target.

Figure 2:
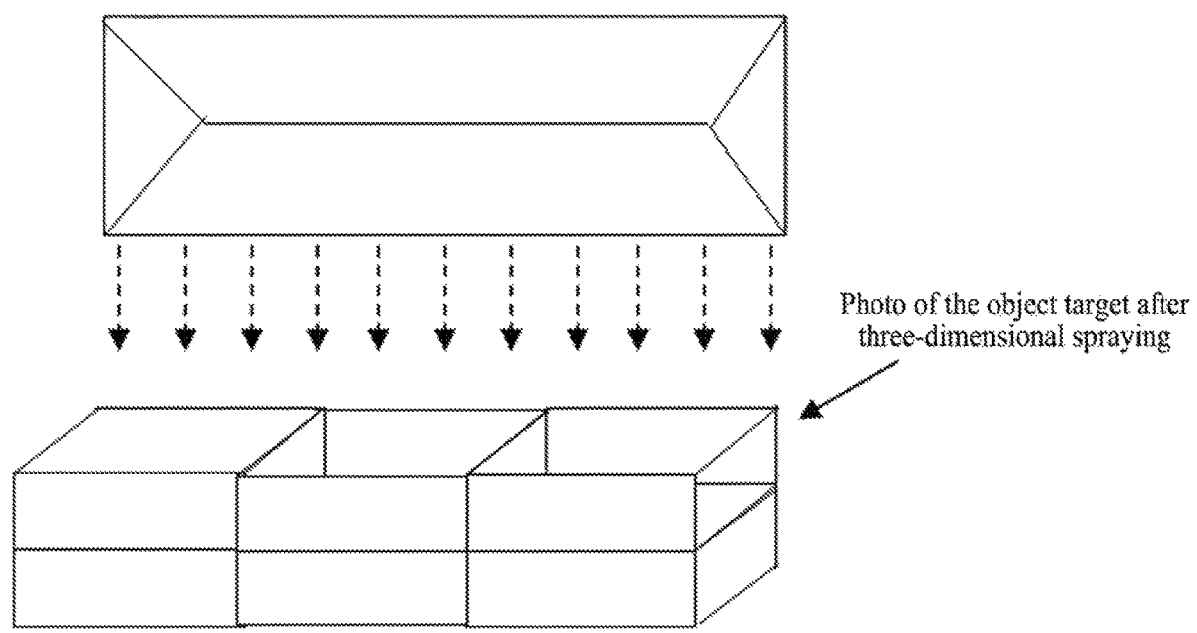
Figure 3:
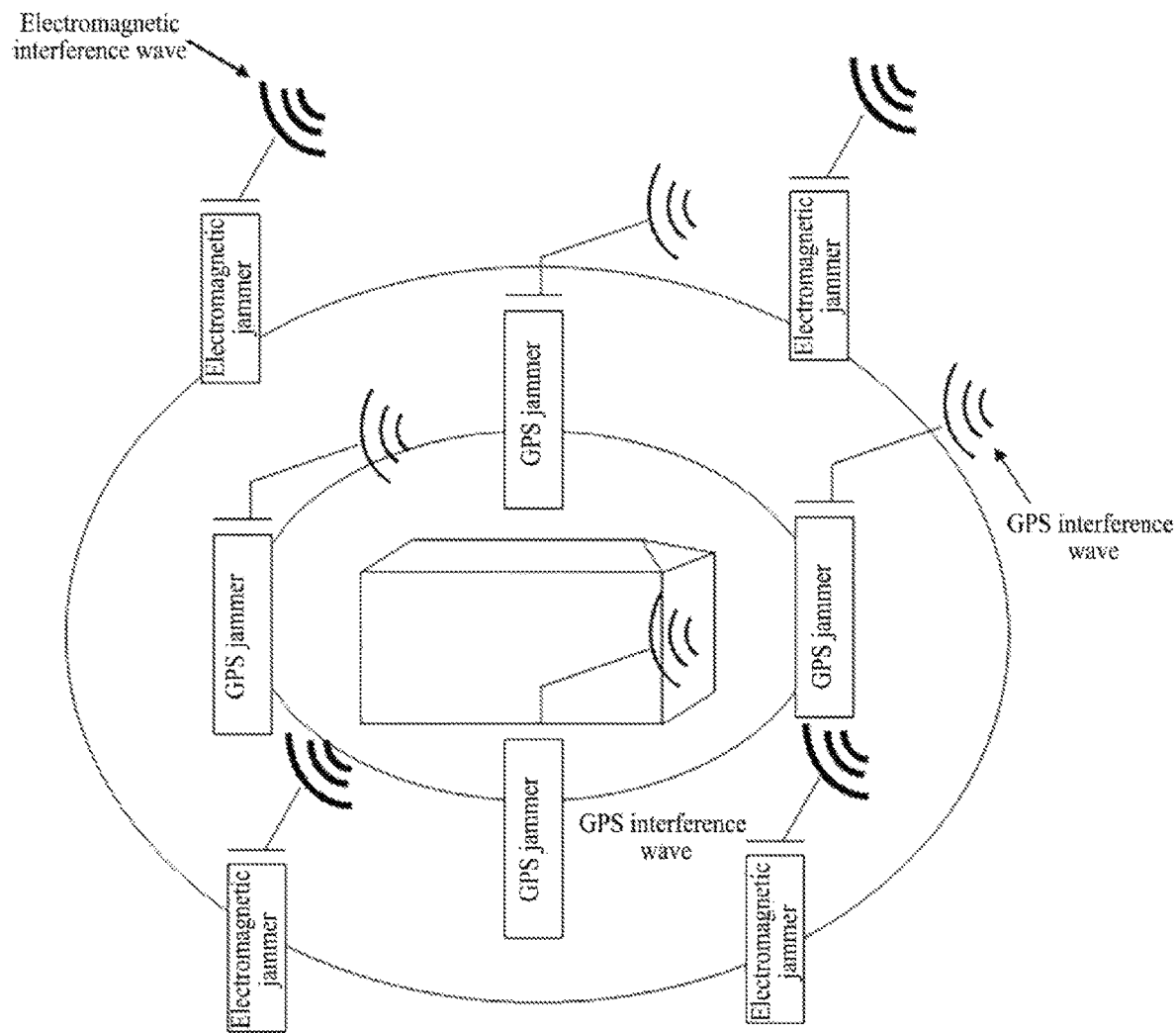

It can be seen clearly that the stealth effects before and after three-dimensional spraying are different by comparing the drawings 1 and 2. FIG. 1 is a schematic diagram of a roof photo of a roof before three-dimensional spraying. FIG. 1 shows a photo of an object target obtained by photographing the object target on the ground from a top view. FIG. 2 shows a roof photo of the roof after three-dimensional spraying. Also by photographing from a top view, in FIG. 2, a top surface of the roof after three-dimensional spraying of the roof in the photo is evolved and transformed into a sidewalk made of tiles. The aerial photographic reconnaissance situation is the same as results obtained by space photographic reconnaissance satellites as well as electromagnetic detection, laser detection, GPS positioning detection techniques are similar and will therefore not be described The three-dimensional spraying data and the three-dimensional spraying templates in step A are three-dimensional spraying data of the object target obtained by comparing the aerial or ground photos of the geographical environment in which the object target required of stealth on the ground is located through the computer simulation design. At the same time, the corresponding three-dimensional spraying templates in simulation mode are produced for comparison, wherein the aerial or ground photos include photos obtained by photographing the object target from five views.

The three-dimensional spraying templates in step B comprise various types of templates with an effect of simulating the surrounding geographical environment. Various types of three-dimensional spraying data of buildings, objects and military targets on the ground are collected while producing the corresponding three-dimensional spraying templates, so that the three-dimensional spraying can be carried out immediately on the buildings, objects and military targets on the ground according to the urgency and risk of the object target required to be protected, defended and guarded, thereby achieving the purpose of random strain while effectively addressing threats that the protected, defended and guarded object targets may be attacked by cruise missiles, precision guided bombs and other assault weapons launched in air or space.

The three-dimensional spraying equipment in step C comprises heavy or large helicopter modified digital spraying equipment, large self-propelled digital spraying equipment with lifting mechanism built-in and hand-held manual spraying equipment, where the heavy or large helicopter modified digital spraying equipment and the large self-propelled digital spraying equipment with lifting mechanism built-in are special digital spraying equipment for three-dimensional spraying controlled by the industrial personal computer and capable of directly inputting the computer simulated three-dimensional spraying data adapted to the surrounding geographical environment of the target object into the built-in spraying equipment so as to carry out three-dimensional stealth spraying on the surfaces of the buildings, objects and military targets required of stealth on the ground.

The heavy or large helicopter modified digital spraying equipment is used for carrying out rapid three-dimensional stealth spraying on key military buildings.

The key military buildings comprise military bases of armed forces, satellite launch sites or intercontinental ballistic missile silos.

The large self-propelled digital spraying equipment with lifting mechanism is used for carrying out rapid three-dimensional stealth spraying on large buildings with groups of buildings.

The large buildings with groups of buildings comprise military command centers, large dams and groups of important buildings.

The hand-held manual spraying equipment is used for carrying out three-dimensional stealth spraying on key vehicles or remote radar stations in case of emergency.

A stealth material against electromagnetic detection and laser detection is added to the spraying coating in step D to solve the problem of carrying out electromagnetic detection and laser detection as well as photographic reconnaissance in the airspaces at the same time, thereby achieving the stealth effect against all optical reconnaissance equipment as well as the electromagnetic detection equipment and laser detection equipment at the same time.

According to the invention, the stealth method by use of three-dimensional spraying can deceive photographic reconnaissance, electromagnetic detection and optical reconnaissance employed in photographic reconnaissance equipment, electromagnetic detection and laser detection equipment and GPS geographic location reconnaissance equipment in airspaces and during ground remote reconnaissance by changing the actual appearances of five surfaces of the object target exposed at the ground surface, thereby achieving the purpose of hiding object targets required to be given key protection, defense and guard on the ground. During entirely changing the computer simulation design of the actual appearances of the buildings, objects and military targets required of stealth on the ground, a key consideration shall first be given to how to appropriately fuse the five surfaces of the object target with the geographical environment from different views during computer simulation, the flaws at the joints of its five surfaces must be completely avoided, in order to prevent the problem that the flaws exposed due to low degree of fusion with the geographical environment allow the stealth by use of three-dimensional spraying to be self-defeating. Accordingly, when the stealth spraying is carried out on the object target on the ground through a three-dimensional spraying technology and the optical stealth problem of the object target on the ground is solved, a stealth material against the electromagnetic detection, laser detection and other reconnaissance equipment is also added to the three-dimensional spraying coating, allowing the spraying technology of the invention to become a new stealth technology which integrates optical stealth, electromagnetic stealth and laser stealth by using the three-dimensional spraying coating. To further improve the guarding ability of the object target on the ground, a certain number of electromagnetic jammers and GPS jammers shall also be erected and deployed around the object target on the ground. The number of the erected and deployed electromagnetic jammers and GPS jammers depends on the transmission power as well as interference frequency range and interference power of the electromagnetic jammers and GPS jammers, thus finally realizing the completion of a highest level stealth design scheme for the object target required to be given key protection, defense and guard on the ground.

The stealth method by use of three-dimensional spraying according to the invention can also achieve the purpose of hiding various aviation equipment, ocean ships and land equipment by changing the surface characteristics of some specific object targets in three-dimensional space. 1. Aeronautical equipment flying in the air, by use of a three-dimensional spraying method, can be sprayed into a shape of clouds in the sky according to the computer simulation design and the number of equipment, in order to mislead or deceive various reconnaissance and detection equipment of the attacker over the horizon, so that the medium-range and long-range air-to-air guided missiles launched by the attacker cannot launch destructive attacks against the aeronautical equipment due to the change of surface characteristics of the aeronautical equipment. 2. Similarly, for a certain number of marine equipment sailing on the sea, surfaces of object targets thereof, by use of three-dimensional spraying and earth curvature, can also be sprayed into a shape of sea wave according to the computer simulation design and the number of equipment, allowing the various reconnaissance and detection equipment of the attacker to make a wrong judgment over the earth curvature and the horizon, so that the long-range ship-to-ship missiles or guided missiles launched by the attacker cannot launch destructive attacks against the object targets due to the change of surface characteristics of the marine equipment. 3. Land equipment, based on its geographical environment, can also be well fused with a geographical environment in which object targets are located through computer simulation design, and thoroughly integrated with the surrounding environment through three-dimensional stealth spraying on its surfaces on the eve of the attack launched by the attacker against the object targets required of stealth, so that the cruise missiles and precision guided bombs launched by the attacker cannot launch destructive attacks by electromagnetic detection, laser detection, GPS detection, image comparison and many other technical means against the object targets required to be protected due to the object targets being hidden in the surrounding environment, and these cruise missiles and precision guided bombs launched against the object targets are deviated from attack courses thereof or self-destructed in case of losing the object targets on the ground, thereby achieving the purpose of maximally protecting key land equipment.

While the invention has been described in detail by general description and specific embodiments thereof, it will be apparent to those skilled in the art that modifications and improvements may be made thereto based on the invention. Therefore, all modifications and improvements made without departing from the spirit of the invention shall fall within the protection scope of the invention.

What is claimed is:

1. A stealth method by use of three-dimensional spraying, wherein the stealth method by use of three-dimensional spraying comprises the following steps of:
  A. Firstly photographing an object target on the ground and then archiving the photographs, and carrying out computer simulation design on the geographical environment in which the object target is located according to the aerial photos of the photographed object target to obtain three-dimensional spraying data adapted to the surrounding geographical environment of the object target to be sprayed on the ground;
  B. Producing three-dimensional spraying templates for comparison according to the three-dimensional spraying data;
  C. Producing desired three-dimensional spraying equipment;
  D. Producing spraying coating for three-dimensional spraying;
  E. Spraying the spraying coating on surfaces of the object target on the ground by means of the three-dimensional spraying equipment, where the three-dimensional spraying equipment is controlled by an industrial personal computer according to the three-dimensional simulation spraying data; and
  F. Erecting and deploying electromagnetic jammers and GPS jammers around the object target on the ground to effectively interfere with and suppress space, sky and ground electromagnetic detection equipment and GPS positioning detection equipment of an attacker in a frequency band.

2. The stealth method by use of three-dimensional spraying according to claim 1, wherein the three-dimensional spraying data in step A and step B is three-dimensional spraying data of different types obtained by comparing the aerial or ground photos of the geographical environment in which the object target on the ground is located and carrying out the computer simulation design; a variety of three-dimensional spraying templates in simulation mode are produced for comparison needs, wherein the aerial or ground photos include photos obtained by photographing the object target from front, rear, left, right and top views.

3. The stealth method by use of three-dimensional spraying according to claim 2, wherein the three-dimensional spraying equipment in step C comprises helicopter modified digital spraying equipment, self-propelled digital spraying equipment with lifting mechanism built-in and hand-held manual spraying equipment, where the helicopter modified digital spraying equipment and the self-propelled digital spraying equipment with lifting mechanism built-in both are special digital spraying equipment for three-dimensional spraying controlled by the industrial personal computer and capable of directly inputting the computer simulated three-dimensional spraying data adapted to the surrounding geographical environment of the target object into the built-in spraying equipment while carrying out three-dimensional stealth spraying on the surfaces of the object target on the ground.

4. The stealth method by use of three-dimensional spraying according to claim 3, wherein the helicopter modified digital spraying equipment is used for carrying out three-dimensional spraying on military buildings.

5. The stealth method by use of three-dimensional spraying according to claim 4, wherein the military buildings comprise military bases of armed forces, satellite launch sites or intercontinental ballistic missile silos.

6. The stealth method by use of three-dimensional spraying according to claim 3, wherein the self-propelled digital spraying equipment with lifting mechanism is used for carrying out three-dimensional spraying on buildings with groups of buildings.

7. The stealth method by use of three-dimensional spraying according to claim 6, wherein the buildings with groups of buildings comprise military command centers and large dams.

8. The stealth method by use of three-dimensional spraying according to claim 3, wherein the hand-held manual spraying equipment is used for carrying out emergency spraying on vehicles or radar stations.

9. The stealth method by use of three-dimensional spraying according to claim 1, wherein a stealth material against electromagnetic detection and laser detection is added to the spraying coating in step D.

* * * * *